(12) United States Patent
Vargas

(10) Patent No.: US 6,510,814 B1
(45) Date of Patent: Jan. 28, 2003

(54) CAT LITTER STORAGE AND DISPENSING SYSTEM

(76) Inventor: Maria Vargas, 16342 Corta Dr., Victorville, CA (US) 92392

(*) Notice: Subject to any disclaimer, the term of this patent is extended or adjusted under 35 U.S.C. 154(b) by 0 days.

(21) Appl. No.: 10/028,535
(22) Filed: Oct. 25, 2001
(51) Int. Cl.$^7$ .................................................. A01K 29/00
(52) U.S. Cl. ......................................................... 119/165
(58) Field of Search .................................. 119/161, 162, 119/165, 166, 52.1, 53, 53.5, 54, 56.1

(56) References Cited

U.S. PATENT DOCUMENTS

| | | | |
|---|---|---|---|
| 3,796,188 A | * | 3/1974 | Bradstreet |
| 3,908,597 A | * | 9/1975 | Taylor |
| 5,394,835 A | * | 3/1995 | Gatta ........................... 119/165 |
| 5,749,317 A | * | 5/1998 | Richey et al. ............... 119/166 |
| 5,809,934 A | * | 9/1998 | Gavet ......................... 119/52.1 |
| 5,819,686 A | * | 10/1998 | Credeur ...................... 119/51.5 |

* cited by examiner

Primary Examiner—Thomas Price
(74) Attorney, Agent, or Firm—Goldstein & Lavas, P.C.

(57) ABSTRACT

A cat litter storage and dispensing system that will allow cat owners to easily change and refill a litter box including a housing having a closed upper end, an open lower end, a front wall, a back wall, opposed side walls, and a hollow interior. The closed upper end has an opening therein exposing the hollow interior. The housing receives a quantity of cat litter within the hollow interior. A funnel member is coupled with the open lower end of the housing. The funnel member has an open wide upper end and an open narrow lower end. The open wide upper end is secured to the open lower end of the housing. The funnel member includes a slotted opening therethrough upwardly of the open narrow lower end. The funnel member includes a stop plate slidably received within the slotted opening for covering the open narrow lower end. A plurality of wall-mountable brackets are adapted for being secured to a wall area and coupled with the housing whereby the housing is elevated over a litter box.

2 Claims, 3 Drawing Sheets

CAT LITTER STORAGE AND DISPENSING SYSTEM

BACKGROUND OF THE INVENTION

The invention relates to a cat litter storage and dispensing system that will allow cat owners to easily change and refill a litter box.

Typical cat owners change their cat's litter boxes once or twice a week. This is often a messy and generally unpleasant task requiring the emptying of the soiled litter from the litter box and the adding of fresh litter to the litter box. In particular, the adding of new litter to the litter box can be extremely messy because it requires the cat owner to hold a heavy bag of the cat litter while pouring it into the much smaller litter box. The result, frequently, is amounts of the litter spilling over the sides of the litter box requiring extra clean up by the cat owner. What is needed is a device that will allow cat litter to be easily and cleanly added to a cat litter box.

The present invention attempts to solve the abovementioned problem by providing a cat litter storage and dispensing system that will allow cat owners to easily change and refill a litter box.

SUMMARY OF THE INVENTION

It is an object of the invention to produce a cat litter storage and dispensing system that will allow cat owners to easily change and refill a litter box including a housing having a closed upper end, an open lower end, a front wall, a back wall, opposed side walls, and a hollow interior. The closed upper end has an opening therein exposing the hollow interior. The opening has a door removably coupled thereto. The front wall has a window therein extending between the closed upper end and the open lower end. The front wall has a slotted opening therein upwardly of the open lower end. The slotted opening removably receives a grate plate therein. The grate plate is dimensioned for completely covering the open lower end. The back wall has a plurality of protrusions extending outwardly therefrom. The opposed side walls each have an indented handle formed therein. The housing receives a quantity of cat litter within the hollow interior. A funnel member is coupled with the open lower end of the housing. The funnel member has an open wide upper end and an open narrow lower end. The open wide upper end is secured to the open lower end of the housing. The funnel member includes a slotted opening therethrough upwardly of the open narrow lower end. The funnel member includes a stop plate slidably received within the slotted opening for covering the open narrow lower end. A plurality of wall-mountable brackets are adapted for being secured to a wall area. The brackets each have slots formed therein for receiving the protrusions of the back wall of the housing therein whereby the housing is elevated over a litter box. A supplemental support bar extends downwardly from the housing. The support bar has a lower end positionable on a floor surface when the housing is secured within the wall-mountable brackets.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
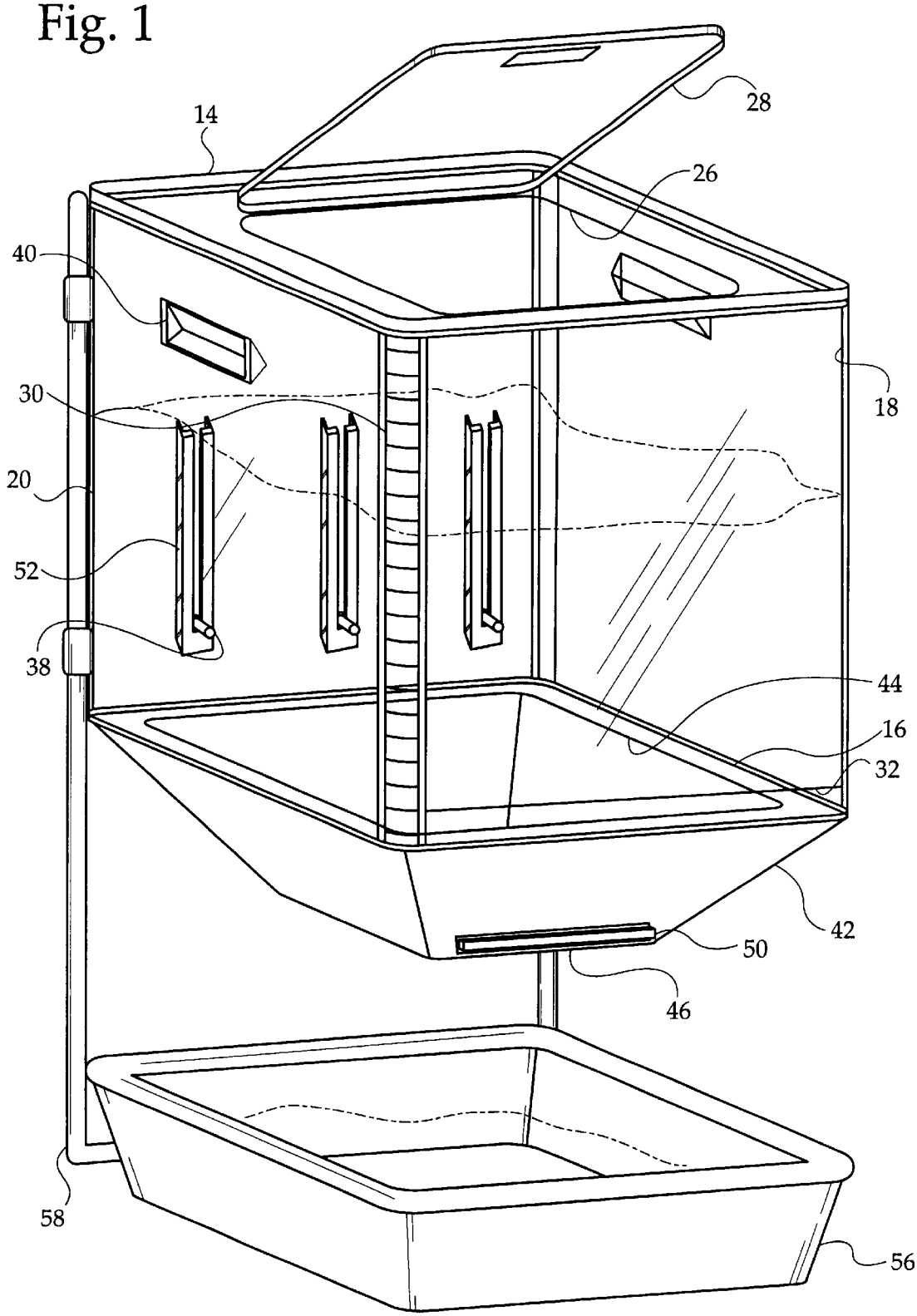
FIG. 1 is a perspective view of the present invention.
Figure 2:
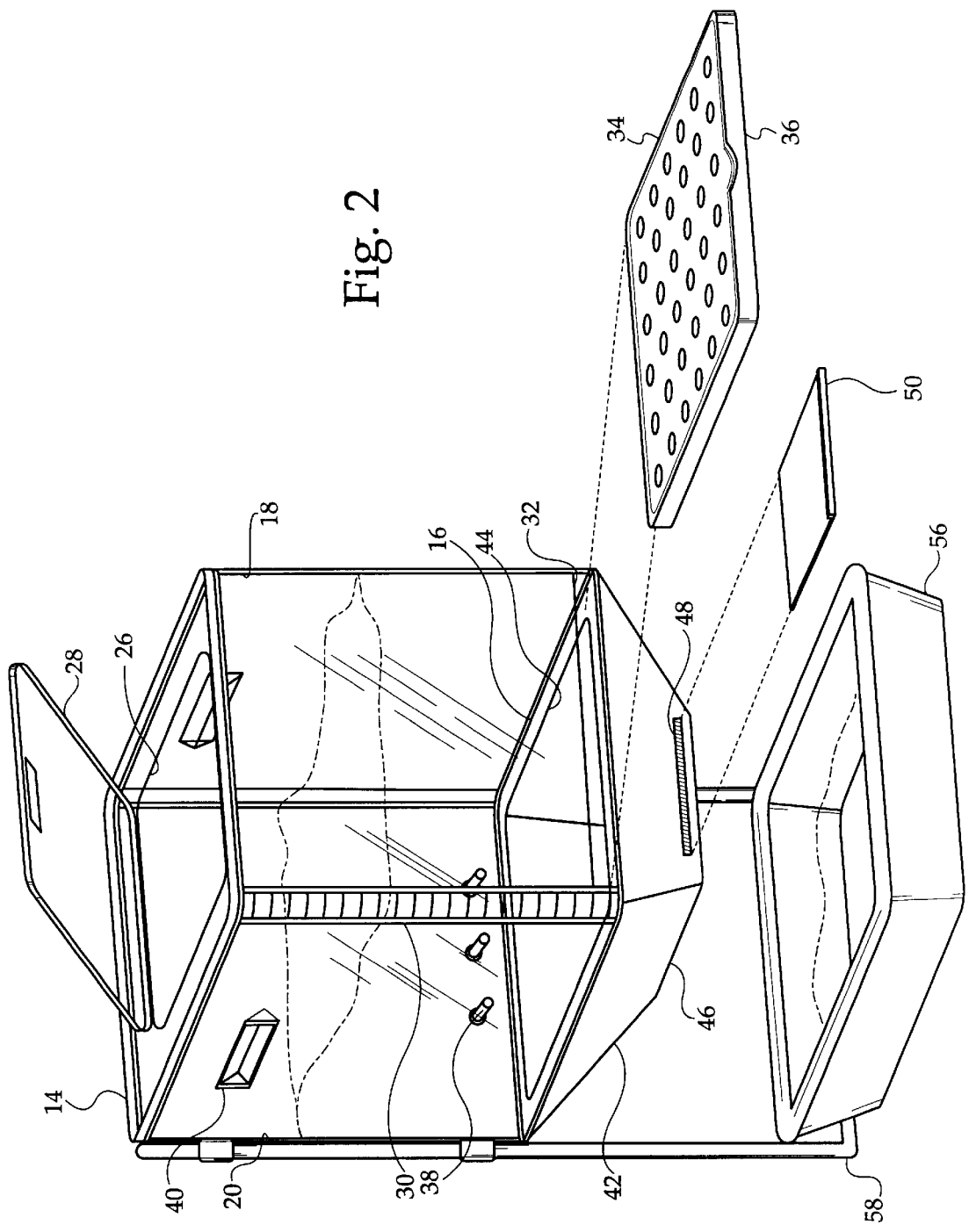
FIG. 2 is an exploded perspective view of the present invention.
Figure 4:
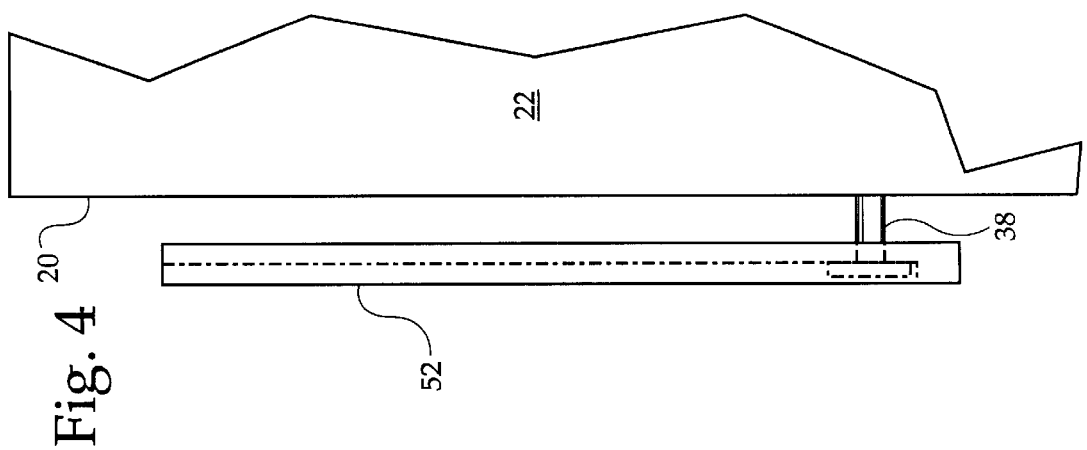
FIG. 4 is a partial side view of the present invention illustrating the coupling of the housing to the wall-mountable brackets.
Figure 3:
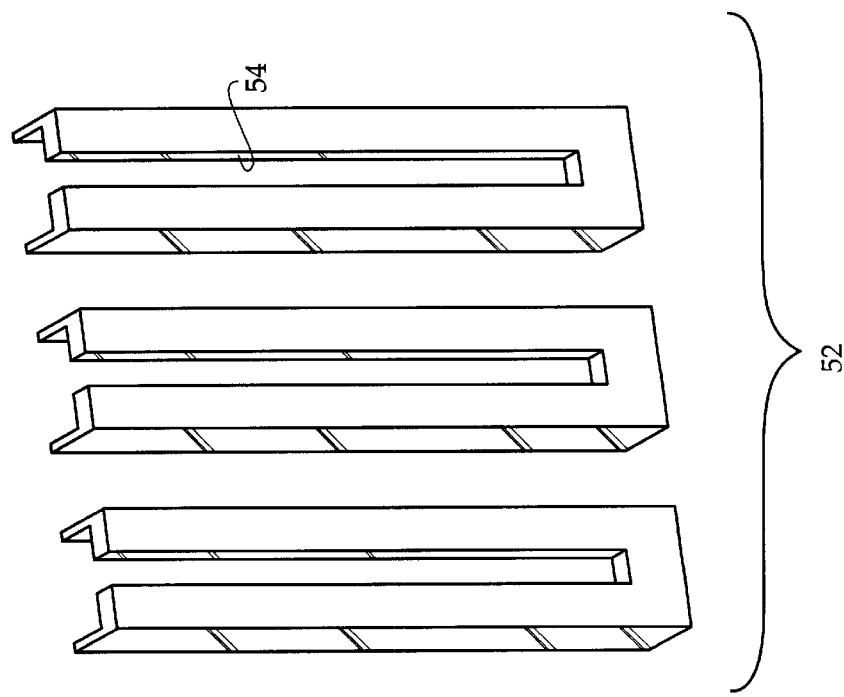
FIG. 3 is a perspective view of the wall-mountable brackets of the present invention.

It will be noted in the various figures that the device relates to a cat litter storage and dispensing system that will allow cat owners to easily change and refill a litter box. In its broadest context, the device consists of a housing, a funnel member, a plurality of wall-mountable brackets, and a supplemental support bar. Such components are individually configured and correlated with respect to each other so as to attain the desired objective.

The housing 12 has a closed upper end 14, an open lower end 16, a front wall 18, a back wall 20, opposed side walls 22, and a hollow interior. The closed upper end 14 has an opening 26 therein exposing the hollow interior. The opening 26 has a door 28 removably coupled thereto. The opening 26 allows fresh cat litter to be added into the housing 12. The front wall 18 has a window 30 therein extending between the closed upper end 14 and the open lower end 16. The window 30 allows a cat owner to easily see how much cat litter remains within the housing 12. The front wall 18 has a slotted opening 32 therein upwardly of the open lower end 16. The slotted opening 32 removably receives a grate plate 34 therein. The grate plate 34 is dimensioned for completely covering the open lower end 16. The grate plate 34, when in place, will slow the flow of cat litter through the open lower end 16. Additionally, the grate plate 34 is provided with a finger notch 36 to allow for its removal from the slotted opening 32. The back wall 20 has a plurality of protrusions 38 extending outwardly therefrom. The opposed side walls 22 each have an indented handle 40 formed therein. The housing 12 receives a quantity of cat litter within the hollow interior.

The funnel member 42 is coupled with the open lower end 16 of the housing 12. The funnel member 42 has an open wide upper end 44 and an open narrow lower end 46. The open wide upper end 44 is secured to the open lower end 16 of the housing 12. The funnel member 42 includes a slotted opening 48 therethrough upwardly of the open narrow lower end 46. The funnel member 42 includes a stop plate 50 slidably received within the slotted opening 48 for covering the open narrow lower end 46. The stop plate 50, when in position, will prevent the cat litter from flowing outwardly through the open narrow lower end 46.

The plurality of wall-mountable brackets 52 are adapted for being secured to a wall area. The brackets 52 each have slots 54 formed therein for receiving the protrusions 38 of the back wall 20 of the housing 12 therein whereby the housing 12 is elevated over a litter box 56.

The supplemental support bar 58 extends downwardly from the housing 12. The support bar 58 has a lower end positionable on a floor surface when the housing 12 is secured within the wall-mountable brackets 52. The supplemental support bar 58 will help to keep the housing 12 in an upright orientation when secured to the wall area.

What is claimed is:

1. A cat litter storage and dispensing system that will allow cat owners to easily change and refill a litter box, comprising, in combination:

a housing having a closed upper end, an open lower end, a front wall, a back wall, opposed side walls, and a hollow interior, the closed upper end having an opening therein exposing the hollow interior, the opening having a door removably coupled thereto, the front wall having a window therein extending between the closed upper end and the open lower end, the front wall having a slotted opening therein upwardly of the open lower end, the slotted opening removably receiving a grate plate therein, the grate plate being dimensioned for completely covering the open lower end, the back wall having a plurality of protrusions extending outwardly therefrom, the opposed side walls each having an indented handle formed therein, the housing receiving a quantity of cat litter within the hollow interior;

a funnel member coupled with the open lower end of the housing, the funnel member having an open wide upper end and an open narrow lower end, the open wide upper end being secured to the open lower end of the housing, the funnel member including a slotted opening therethrough upwardly of the open narrow lower end, the funnel member including a stop plate slidably received within the slotted opening for covering the open narrow lower end;

a plurality of wall-mountable brackets adapted for being secured to a wall area, the brackets each having slots formed therein for receiving the protrusions of the back wall of the housing therein whereby the housing is elevated over a litter box; and a supplemental support bar extending downwardly from the housing, the support bar having a lower end positionable on a floor surface when the housing is secured within the wall-mountable brackets.

2. A cat litter storage and dispensing system that will allow cat owners to easily change and refill a litter box, comprising, in combination:

a housing having a closed upper end, an open lower end, a front wall, a back wall, opposed side walls, and a hollow interior, the closed upper end having an opening therein exposing the hollow interior, the front wall having a slotted opening therein upwardly of the open lower end, the slotted opening removably receiving a grate plate therein, the grate plate being dimensioned for completely covering the open lower end, the housing receiving a quantity of cat litter within the hollow interior;

a funnel member coupled with the open lower end of the housing, the funnel member having an open wide upper end and an open narrow lower end, the open wide upper end being secured to the open lower end of the housing, the funnel member including a slotted opening therethrough upwardly of the open narrow lower end, the funnel member including a stop plate slidably received within the slotted opening for covering the open narrow lower end; and a plurality of wall-mountable brackets adapted for being secured to a wall area for coupling with the housing whereby the housing is elevated over a litter box.

* * * * *